(12) United States Patent
Georgiadis et al.

(10) Patent No.: US 10,657,426 B2
(45) Date of Patent: May 19, 2020

(54) ACCELERATING LONG SHORT-TERM MEMORY NETWORKS VIA SELECTIVE PRUNING

(71) Applicant: Samsung Electronics Co., Ltd., Suwon-si, Gyeonggi-do (KR)

(72) Inventors: Georgios Georgiadis, Burbank, CA (US); Weiran Deng, Woodland Hills, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 88 days.

(21) Appl. No.: 15/937,558

(22) Filed: Mar. 27, 2018

(65) Prior Publication Data

US 2019/0228274 A1 Jul. 25, 2019

Related U.S. Application Data

(60) Provisional application No. 62/622,083, filed on Jan. 25, 2018.

(51) Int. Cl.
*G06K 9/66* (2006.01)
*G06K 9/62* (2006.01)
*G06N 3/08* (2006.01)

(52) U.S. Cl.
CPC ............... *G06K 9/66* (2013.01); *G06K 9/627* (2013.01); *G06N 3/08* (2013.01); *G06N 3/082* (2013.01)

(58) Field of Classification Search
CPC ........ G06K 9/66; G06K 9/627; G06K 9/4628; G06K 9/00718; G06K 9/00147;
(Continued)

(56) References Cited

U.S. PATENT DOCUMENTS 5,920,852 A * 7/1999 Graupe .................... G06N 3/04
706/26
7,080,053 B2 7/2006 Adams et al.
(Continued)

OTHER PUBLICATIONS

See, Abigail et al., "Compression of Neural Machine Translation Models via Pruning" Jun. 29, 2016, 11 pages.
(Continued)

*Primary Examiner* — Michael S Osinski
(74) *Attorney, Agent, or Firm* — Lewis Roca Rothgerber Christie LLP

(57) ABSTRACT

A system and method for pruning. A neural network includes a plurality of long short-term memory cells, each of which includes an input having a weight matrix $W_c$, an input gate having a weight matrix $W_i$, a forget gate having a weight matrix $W_f$, and an output gate having a weight matrix $W_o$. In some embodiments, after initial training, one or more of the weight matrices $W_i$, $W_f$, and $W_o$ are pruned, and the weight matrix $W_c$ is left unchanged. The neural network is then retrained, the pruned weights being constrained to remain zero during retraining.

20 Claims, 6 Drawing Sheets

(58) Field of Classification Search
CPC ........... G06K 9/00369; G06K 9/00664; G06K 9/00671; G06K 9/00684; G06N 3/08; G06N 3/0445; G06N 3/0454; G06N 3/063; G06N 3/02; G06N 3/04; G06N 3/049; G06N 3/0481; G06N 3/082
See application file for complete search history.

(56) References Cited

U.S. PATENT DOCUMENTS

| | | | | |
|---|---|---|---|---|
| 7,908,235 | B2* | 3/2011 | Snook | G06F 15/7867 706/43 |
| 8,510,244 | B2* | 8/2013 | Carson | G06N 3/02 706/27 |
| 8,725,238 | B2* | 5/2014 | Liu | A61B 5/0452 600/509 |
| 9,146,546 | B2* | 9/2015 | Sinyavskiy | G06N 3/049 |
| 9,390,371 | B2* | 7/2016 | Deng | G06N 3/0454 |
| 9,760,806 | B1 | 9/2017 | Ning et al. | |
| 9,767,557 | B1* | 9/2017 | Gulsun | G06T 7/0012 |
| 10,032,498 | B2* | 7/2018 | Neil | G06N 3/0445 |
| 10,154,051 | B2* | 12/2018 | Sofka | H04L 63/1416 |
| 10,255,269 | B2* | 4/2019 | Quirk | G06F 17/2775 |
| 10,258,304 | B1* | 4/2019 | Kiraly | G06K 9/6267 |
| 2007/0011118 | A1* | 1/2007 | Snook | G06F 15/7867 706/16 |
| 2010/0241601 | A1* | 9/2010 | Carson | G06N 3/02 706/27 |
| 2016/0099010 | A1 | 4/2016 | Sainath et al. | |
| 2017/0186420 | A1* | 6/2017 | Sak | G10L 15/02 |
| 2017/0293543 | A1* | 10/2017 | Xu | G06F 11/008 |
| 2017/0337472 | A1 | 11/2017 | Durdanovic et al. | |
| 2017/0344829 | A1* | 11/2017 | Lan | G06N 3/0445 |
| 2017/0364766 | A1* | 12/2017 | Das | G06K 9/00664 |
| 2018/0005107 | A1* | 1/2018 | Neil | G06N 3/0481 |
| 2018/0005676 | A1* | 1/2018 | Neil | G11C 11/54 |
| 2018/0063168 | A1* | 3/2018 | Sofka | H04L 63/1416 |
| 2018/0075349 | A1* | 3/2018 | Zhao | G06F 21/563 |
| 2018/0189269 | A1* | 7/2018 | Quirk | G06F 17/2775 |
| 2018/0232631 | A1* | 8/2018 | Appuswamy | G06N 3/049 |
| 2019/0034784 | A1* | 1/2019 | Li | G06N 3/0445 |
| 2019/0050734 | A1* | 2/2019 | Li | G06N 3/0454 |
| 2019/0050735 | A1* | 2/2019 | Ji | G06N 3/082 |
| 2019/0066185 | A1* | 2/2019 | More | G06Q 30/0627 |
| 2019/0087710 | A1* | 3/2019 | Guo | G06F 7/50 |
| 2019/0138896 | A1* | 5/2019 | Deng | G06N 3/0454 |
| 2019/0164046 | A1* | 5/2019 | Song | G06N 3/063 |
| 2019/0180184 | A1* | 6/2019 | Deng | G06N 3/084 |
| 2019/0278378 | A1* | 9/2019 | Yan | H04L 67/22 |
| 2019/0279105 | A1* | 9/2019 | Arel | G06K 9/627 |

OTHER PUBLICATIONS

Tang, Shijian et al., "A pruning based method to learn both weights and connections for LSTM", Oct. 31, 2017, 7 pages.

Zhu, Michael H. et al., "To prune, or not to prune: exploring the efficacy of pruning for model compression", Nov. 13, 2017, pp. 1-11.

* cited by examiner

Input    $\hat{C}_t = \tanh(W_c[h_{t-1}, x_t] + b_c)$
Input Gate    $i_t = S(W_i[h_{t-1}, x_t] + b_i)$
Forget Gate    $f_t = S(W_f[h_{t-1}, x_t] + b_f)$
Output Gate    $o_t = S(W_o[h_{t-1}, x_t] + b_o)$

*FIG. 5A*

State    $C_t = f_t \times C_{t-1} + i_t \times \hat{C}_t$
Output    $h_t = o_t \times \tanh(C_t)$

*FIG. 5B*

$$S(x) = \frac{1}{1+e^{-x}}$$

*FIG. 5C*

ACCELERATING LONG SHORT-TERM MEMORY NETWORKS VIA SELECTIVE PRUNING

CROSS-REFERENCE TO RELATED APPLICATION(S)

The present application claims priority to and the benefit of U.S. Provisional Application No. 62/622,083, filed Jan. 25, 2018, entitled "ACCELERATING LONG SHORT-TERM MEMORY NETWORKS VIA SELECTIVE PRUNING", the entire content of which is incorporated herein by reference.

FIELD

One or more aspects of embodiments according to the present disclosure relate to machine learning, and more particularly to a system and method for selective pruning in a long short-term memory network.

BACKGROUND

Neural networks may be used in various applications, including pattern recognition applications such as image recognition, voice recognition, and speech recognition and translation. Neural networks for some such applications may be sufficiently large to consume significant amounts of power or to operate slowly. In such circumstances it may be possible to improve performance and power consumption by various techniques, however, such techniques may result in a loss of accuracy.

Thus, there is a need for an improved system and method that remedy the aforementioned problems.

SUMMARY

Aspects of embodiments of the present disclosure are directed toward a system and method for pruning. A neural network includes a plurality of long short-term memory cells, each of which includes an input having a weight matrix $W_c$, an input gate having a weight matrix $W_i$, a forget gate having a weight matrix $W_f$, and an output gate having a weight matrix $W_o$. In some embodiments, after initial training, one or more of the weight matrices $W_i$, $W_f$, and $W_o$ are pruned, and the weight matrix $W_c$ is left unchanged. The neural network is then retrained, the pruned weights being constrained to remain zero during retraining.

According to an embodiment of the present invention there is provided a method for performing machine learning in a first neural network including one or more long short-term memory cells, a first long short-term memory cell of the one or more long short-term memory cells including: an input having a first weight matrix $W_c$; an input gate having a first weight matrix $W_i$; a forget gate having a first weight matrix $W_f$; and an output gate having a first weight matrix $W_o$, the method including: maintaining the first weight matrix $W_c$ unchanged; and pruning the first weight matrix $W_f$, the pruning of the first weight matrix $W_f$ including: calculating a standard deviation over a subset of elements of the first weight matrix $W_f$; determining that a first element, at a first position in the first weight matrix $W_f$, fails to meet a first threshold, the first threshold being based on a second threshold and the standard deviation; setting to zero the first element, at the first position in the first weight matrix $W_f$, based on determining that the first element, at the first position in the first weight matrix $W_f$, fails to meet the first threshold; determining that a second element, at a second position in the first weight matrix $W_f$, meets the first threshold; and maintaining the second element unchanged, based on determining that the second element, at the second position in the first weight matrix $W_f$, meets the first threshold.

In one embodiment, a second long short-term memory cell of the one or more long short-term memory cells includes an input gate having a second weight matrix $W_f$ and wherein the calculating of the standard deviation includes calculating a standard deviation over all elements of the first and second weight matrices $W_f$.

In one embodiment, the subset of elements of the first weight matrix $W_f$ includes all elements of the first weight matrix $W_f$.

In one embodiment, a second long short-term memory cell of the one or more long short-term memory cells includes a second weight matrix $W_f$ and wherein the calculating of the standard deviation includes calculating a standard deviation over all elements at the first position in the first and second weight matrices $W_f$.

In one embodiment, the method includes pruning the first weight matrix $W_i$.

In one embodiment, the method includes pruning the first weight matrix $W_o$.

In one embodiment, the first neural network further includes a plurality of artificial neurons and a plurality of connections between the artificial neurons, each of the connections having a weight, and the method further includes: calculating a standard deviation over the weights of the connections; setting to zero the weight of a connection of the plurality of connections when a magnitude of the weight is smaller than a product of a threshold and the standard deviation; and leaving the weight of the connection unchanged, otherwise.

In one embodiment, the method includes retraining the first neural network, the retraining including maintaining the first element equal to zero.

In one embodiment, the method includes operating a second neural network, the second neural network having a weight matrix $W_f$ equal to the weight matrix $W_f$ of the first neural network, the operating including: classifying an image with the second neural network, and controlling a vehicle based on the classifying of the image.

According to an embodiment of the present invention there is provided a system for performing machine learning, the system including a first processing circuit, the first processing circuit being configured to: instantiate a first neural network including one or more long short-term memory cells, a first long short-term memory cell of the one or more long short-term memory cells including: an input having a first weight matrix $W_c$; an input gate having a first weight matrix $W_i$; a forget gate having a first weight matrix $W_f$; and an output gate having a first weight matrix $W_o$, maintain the first weight matrix $W_c$ unchanged; and prune the first weight matrix $W_f$, the pruning of the first weight matrix $W_f$ including: calculating a standard deviation over a subset of elements of the plurality of weight matrices $W_f$; determining that a first element, at a first position in the first weight matrix $W_f$, fails to meet a first threshold, the first threshold being based on a second threshold and the standard deviation; setting to zero the first element, at the first position in the first weight matrix $W_f$, based on determining that the first element, at the first position in the first weight matrix $W_f$, fails to meet the first threshold; determining that a second element, at a second position in the first weight matrix $W_f$, meets the first threshold; and maintaining the second element unchanged, based on determining that the second element, at the second position in the first weight matrix $W_f$, meets the first threshold.

In one embodiment, a second long short-term memory cell of the one or more long short-term memory cells includes an input gate having a second weight matrix $W_f$ and wherein the calculating of the standard deviation includes calculating a standard deviation over all elements of the first and second weight matrices $W_f$.

In one embodiment, the subset of elements of the first weight matrix $W_f$ includes all elements of the first weight matrix $W_f$.

In one embodiment, a second long short-term memory cell of the one or more long short-term memory cells includes a second weight matrix $W_f$ and wherein the calculating of the standard deviation includes calculating a standard deviation over all elements at the first position in the first and second weight matrices $W_f$.

In one embodiment, the first processing circuit is further configured to prune the first weight matrix $W_i$.

In one embodiment, the first processing circuit is further configured to prune the first weight matrix $W_o$.

In one embodiment, the system further includes a plurality of artificial neurons and a plurality of connections between the artificial neurons, each of the connections having a weight, and the first processing circuit is further configured to: calculate a standard deviation over the weights of the connections; set to zero the weight of a connection of the plurality of connections when a magnitude of the weight is smaller than a product of a threshold and the standard deviation; and leave the weight of the connection unchanged, otherwise.

In one embodiment, the first processing circuit is further configured to retrain the first neural network, the retraining including leaving the first element equal to zero.

In one embodiment, the system includes a second processing circuit configured to instantiate a second neural network, the second neural network having a weight matrix $W_f$ equal to the weight matrix $W_f$ of the first neural network, and to: classify images with the second neural network, and control a vehicle based on the classifying of the images.

According to an embodiment of the present invention there is provided a method for performing machine learning in a first neural network including one or more long short-term memory cells, a first long short-term memory cell of the one or more long short-term memory cells including: an input having a first weight matrix $W_c$; an input gate having a first weight matrix $W_i$; a forget gate having a first weight matrix $W_f$; and an output gate having a first weight matrix $W_o$, the method including: maintaining the first weight matrix $W_c$ unchanged; and performing a step for pruning the first weight matrix $W_f$.

In one embodiment, the step for pruning includes: calculating a standard deviation over a subset of elements of the first weight matrix $W_f$; determining that a first element, at a first position in the first weight matrix $W_f$, fails to meet a first threshold, the first threshold being based on a second threshold and the standard deviation; setting to zero the first element, at the first position in the first weight matrix $W_f$, based on determining that the first element, at the first position in the first weight matrix $W_f$, fails to meet the first threshold; determining that a second element, at a second position in the first weight matrix $W_f$, meets the first threshold; and maintaining the second element unchanged, based on determining that the second element, at the second position in the first weight matrix $W_f$, meets the first threshold.

BRIEF DESCRIPTION OF THE DRAWINGS

These and other features and advantages of the present disclosure will be appreciated and understood with reference to the specification, claims, and appended drawings wherein:

FIG. 5A is a set of equations describing the operation of a long short-term memory cell, according to an embodiment of the present disclosure;

FIG. 5B is a set of equations describing the operation of a long short-term memory cell, according to an embodiment of the present disclosure; and FIG. 5C is an equation describing the operation of a long short-term memory cell, according to an embodiment of the present disclosure.

DETAILED DESCRIPTION

The detailed description set forth below in connection with the appended drawings is intended as a description of exemplary embodiments of a system and method for selective pruning in a long short-term memory network provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
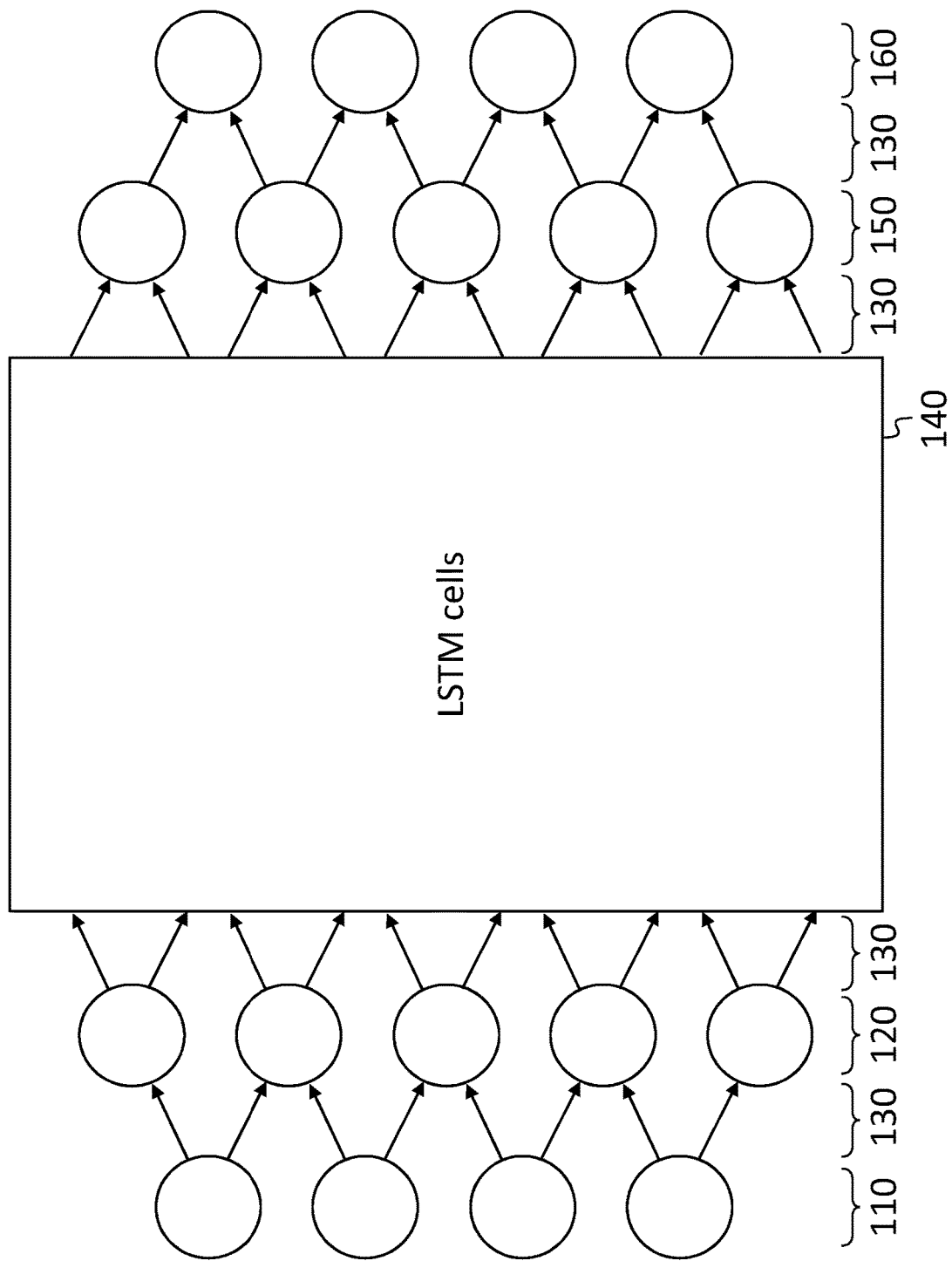
FIG. 1A is a schematic illustration of a neural network, according to an embodiment of the present disclosure.

Referring to FIG. 1A, in some embodiments a neural network includes an input layer 110 including a first plurality of artificial neurons and a first hidden layer 120, as shown. Each of the artificial neurons of the input layer 110 is connected to one or more of the artificial neurons of the first hidden layer 120 by one or more connections 130. A network of long short-term memory cells 140 (described in further detail below) is further connected to the first hidden layer by one or more connections 130, a second hidden layer 150 is connected to the network of long short-term memory cells 140 by one or more connections 130, and an output layer 160 is connected to the second hidden layer 150 by one or more connections 130. The network of long short-term memory cells 140 may have one layer, or a plurality of layers, each layer including one or more long short-term memory cells 140. Each connection 130 may have an associated weight, which conceptually may be equivalent to a gain, or multiplicative factor, applied to the signal when transmitted from one artificial neurons to another. The weight of a connection 130 may therefore determine the degree to which one artificial neuron, of the two artificial neurons connected by the connection, influences the other artificial neuron of the two artificial neurons connected by the connection In the neural network of FIG. 1A, each artificial neuron of each of the layers (except the output layer 160) is illustrated for simplicity as connected only to one or two of the artificial neurons of the succeeding layer but the disclosure is not limited to such an embodiment, and in general more or fewer connections may be present. For example, in some embodiments, one or more of the artificial neurons of one of the layers are each connected to all of the artificial neurons of the succeeding layer. In some embodiments more or fewer hidden layers are present preceding or following the network of long short-term memory cells 140, or one or both of the input layer 110 and the output layer 160 may be absent (so that the inputs of the neural network are inputs of the long short-term memory cells 140 and/or the outputs of the neural network are outputs of the long short-term memory cells 140).

Figure 1B:
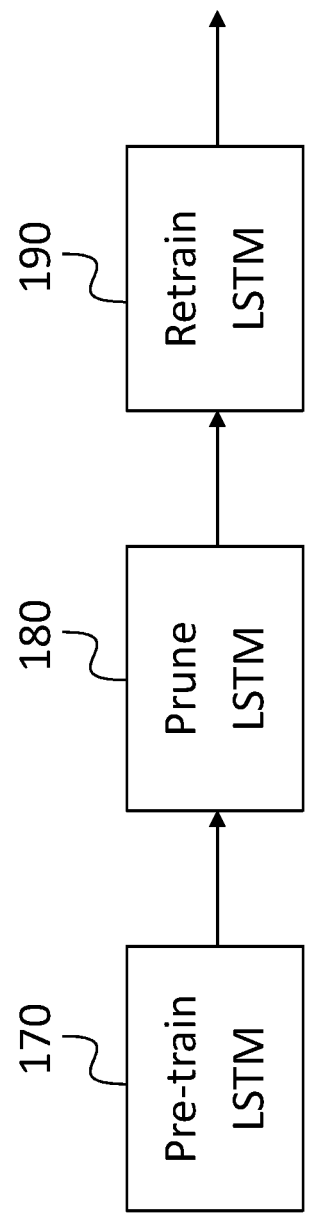
FIG. 1B is a flow chart of a method for pruning, according to an embodiment of the present disclosure.

Referring to FIG. 1B, in some embodiments a method for training the neural network includes, at 170, training (or "pre-training") the network of long short-term memory cells, to determine weights within the network of long short-term memory cells (as discussed in further detail below), pruning the weights, at 180, (e.g., setting certain weights to zero, according to one or more of a number of methods discussed in further detail below) and then, at 190, retraining the network of long short-term memory cells (e.g., determining weights subject to the constraint of leaving the value of the pruned weights equal to zero).

Figure 2:
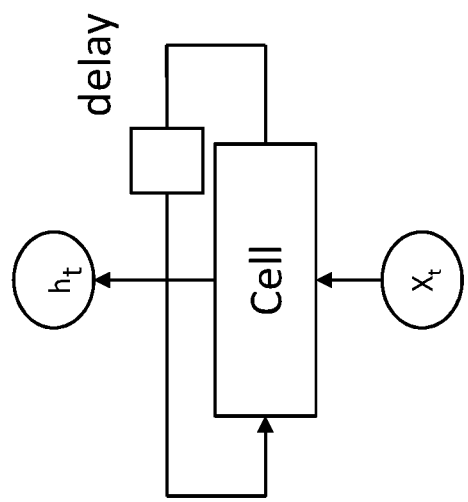
FIG. 2 is a block diagram of a neuron-like node, according to an embodiment of the present disclosure.
Figure 3:
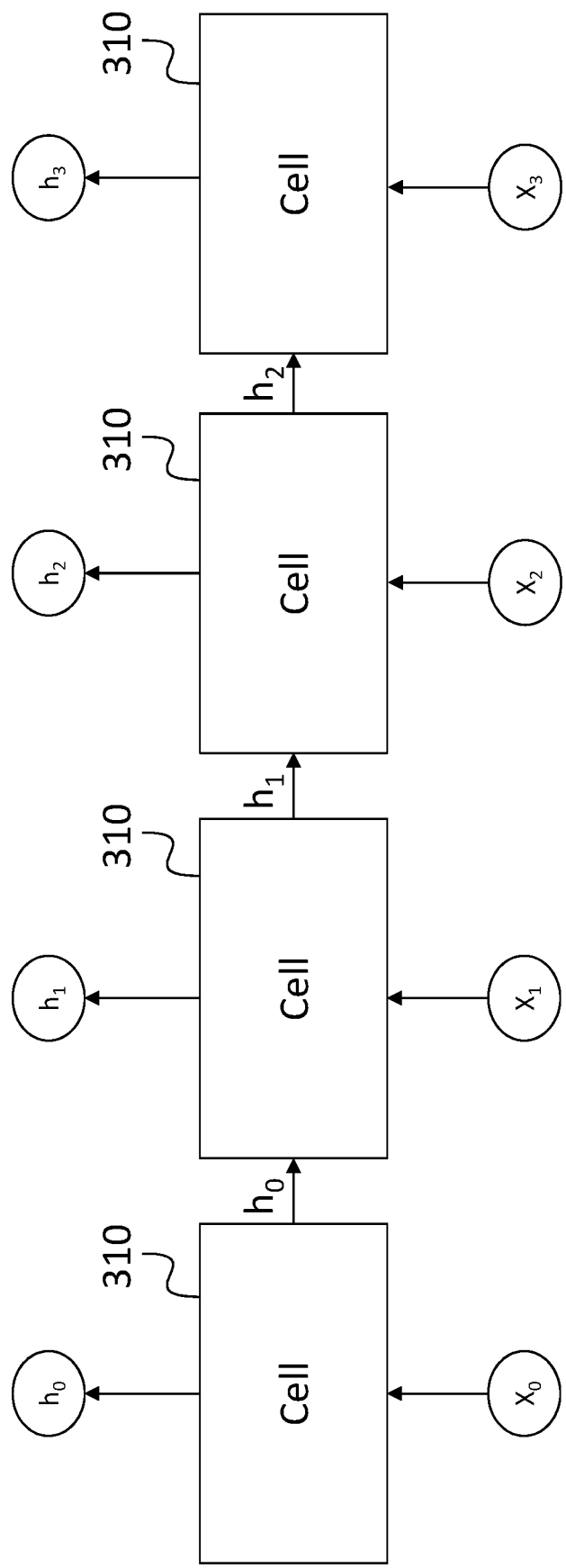
FIG. 3 is a block diagram of a network of long short-term memory cells, according to an embodiment of the present disclosure.

The structure of the network of long short-term memory cells may be based on a network of neuron-like nodes such as the node illustrated in FIG. 2, each including a feedback loop so that the output of the node, at any time step, depends both on the output of the node at the previous time step, and on the external input signal. The node of FIG. 2 may be unrolled to form the network of FIG. 3, which includes a plurality of long short-term memory cells 310, each receiving a respective "external" input signal $X_i$ and producing an "external" output signal $Z_i$. Each of the long short-term memory cells except the last also produces an "adjacent" output signal $H_i$ and each of the long short-term memory cells except the first also receives a an "adjacent" output signal $H_{i-1}$. In a network of long short-term memory cells with more than one layer, each of the external outputs $Z_i$ of one layer may be connected to a respective external input $X_i$ of a subsequent layer.

Figure 4:
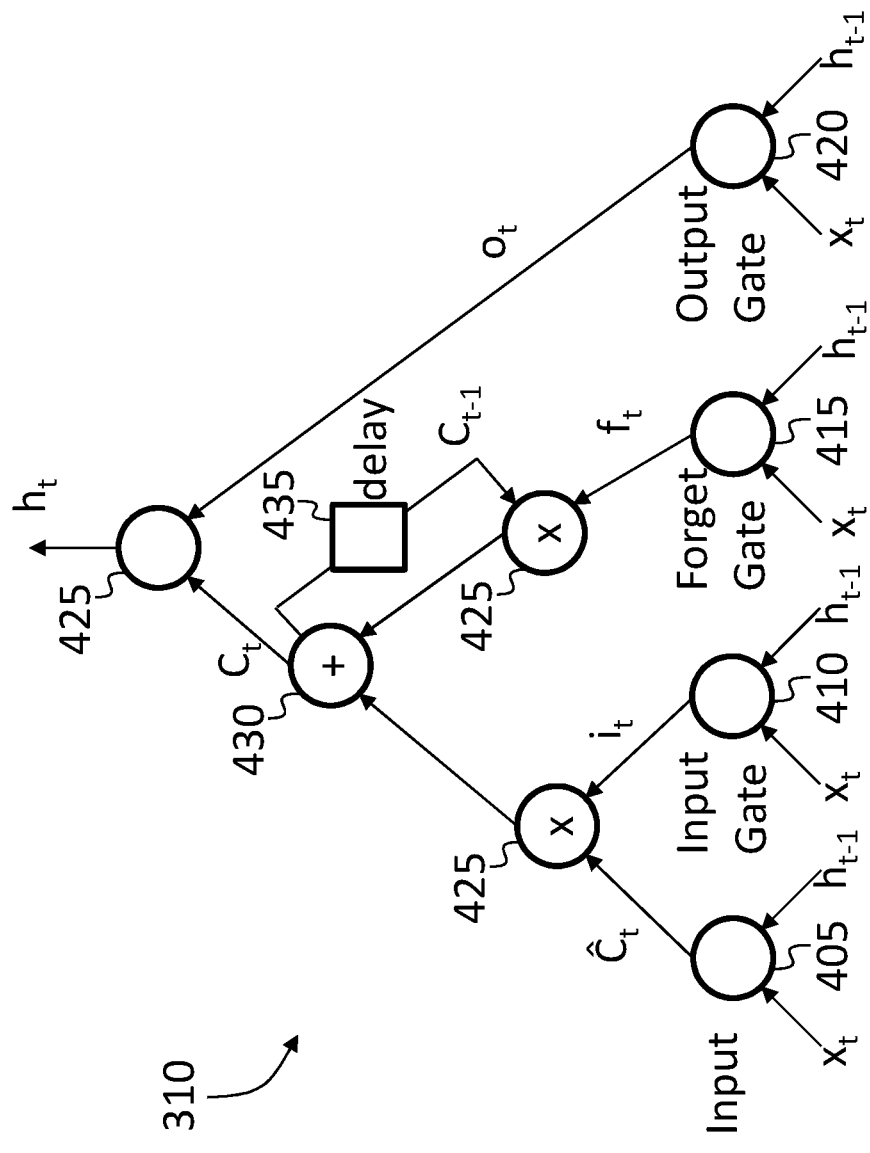
FIG. 4 is a block diagram of a long short-term memory cell, according to an embodiment of the present disclosure.

Each of the long short-term memory cells 310 may have the internal structure illustrated in FIG. 4. The external and adjacent input signals are fed to an input 405, an input gate 410, a forget gate 415, and an output gate 420. Each of the long short-term memory cells 310 may further have three element-wise multipliers 425, an (element-wise) adder 430 and a delay 435 that delays the signal by one time step. The input 405, the input gate 410, the forget gate 415, and the output gate 420 may implement the equations of FIG. 5A, and the state and output may then be given by the equations of FIG. 5B. Each of the input 405, the input gate 410, the forget gate 415, and the output gate 420 implements a sigmoid function S( ), defined in the equation of FIG. 5C. Symbols in italic font in FIGS. 5A-5C have the same meaning as otherwise identical symbols, in non-italic font, elsewhere herein. Conceptually, in operation, $C_t$ summarizes the "knowledge" learnt up to the present time step, $f_t$ removes old "redundant" information from $C_t$, $\hat{C}_t$ summarizes new information from $x_t$ and $h_{t-1}$ adds new "useful" information to $C_t$ from $\hat{C}_t$. Each of $W_f$, $b_f$, $W_i$, $W_c$, $b_c$, $W_o$, and $b_o$ is a matrix or vector to be learnt during training. The quantities $b_f$, $b_c$, and $b_o$ are bias vectors, as may be seen from the equations of FIG. 5A. Each of the weights (or "weight matrices") $W_f$, $W_i$, $W_c$, and $W_o$ is a matrix. In the equations of FIG. 5A, the tan h( ) and sigmoid (S( )) functions are element-wise functions, and a pair of square brackets enclosing two values separated by a comma (each of the values being a column vector) identifies the vector formed by vertically concatenating the two values.

The neural network may be trained using supervised learning with a training data set. During training, the weights and other learned parameters may be adjusted iteratively, so as to minimize a cost function evaluated over the training data. Once training has been completed, some of the weights may have sufficiently small values that setting them to zero (in a process referred to herein as "pruning") and then retraining the neural network (while constraining the pruned weights to remain zero) results in a neural network the accuracy of which is nearly the same as that of the unpruned neural network. Such pruning may result in a neural network that is capable of operating (i.e., performing classifications) faster and/or with lower power consumption (i.e., lower energy consumed per classification performed). Such benefits may be particularly important in implementations (e.g., in mobile devices or automotive systems) that are power, mass, or volume constrained.

In some embodiments, application-specific hardware (e.g., an application specific integrated circuit) may be fabricated that takes advantage of the absence of signal paths or calculating circuits corresponding to pruned weights. For example, if a long short-term memory cell 310 is fabricated using a dedicated processing circuit (instead of, for example, software or firmware that may cause a stored-program computer to instantiate the long short-term memory cell 310), then if an element of one of the weights $W_f$, $W_i$, or $W_c$ is zero, the circuit that otherwise would be present to implement the corresponding operations in the corresponding gate (or input, for $W_i$) may be entirely absent from the application-specific hardware, resulting in cost, volume, and mass savings, and possibly resulting in power savings. If the network of long short-term memory cells is implemented in software or firmware (e.g., software or firmware for execution on a stored-program computer such as a graphics processing unit), then pruning may result in a reduction in the size of memory required, along with accompanying power, mass, and volume savings, and it may also result in faster execution by making possible the omission of operations that if performed would consistently produce the same output (e.g., a zero output, or an output equal to a constant bias).

Each of the weights may be a matrix. Pruning of the weights of the long short-term memory cells 310 of the neural network may proceed as follows, for one layer of the network of long short-term memory cells. For example, for the weights $W_f$, a standard deviation may be calculated over a subset of the elements of the weights $W_f$ (where the subset may be a proper subset or may include all of the elements), e.g., (i) over all of the elements of all of the weights $W_f$ of the layer, or (ii) over all of the elements of one of the weights $W_f$ of the layer, or (iii) over all of the elements at a certain position in the weights $W_f$ (e.g., each element that is at the $i^{th}$ column and the $j^{th}$ row of a respective weight matrix $W_f$). The standard deviation may then be multiplied by a pruning threshold (or a respective pruning threshold, if several standard deviations are calculated), and each element having an absolute value (or "magnitude") less than the product of the threshold (or the respective threshold, if a proper subset is used to calculate the standard deviation, and there are multiple thresholds) and the standard deviation (or the respective standard deviation) may be set to zero. The other elements (i.e., the elements not having an absolute value less than the product of the threshold and the standard deviation) may be left unchanged.

The weights Wi and Wo may be pruned in an analogous manner. In each case the respective pruning threshold may be determined empirically, e.g., by increasing it gradually until the accuracy of the neural network degrades to an extent that is not an acceptable cost for the benefits realized as a result of the pruning. The weights $W_c$ may be left unchanged (i.e., these weights may be exempt from pruning). Table 1 shows results of testing with an exemplary neural network, demonstrating that pruning of the weights $W_f$, $W_i$, and $W_o$ results in only modest loss of accuracy, whereas pruning of $W_c$ results in a significant loss of accuracy.

TABLE 1

|  | No Pruning | Prune $W_f$ | $W_i$ | $W_c$ | $W_o$ |
|---|---|---|---|---|---|
| Percentage of zero parameters | 0.0% | 21.5% | 21.7% | 21.7% | 21.66% |
| Testing accuracy | 92.77% | 92.29% | 92.19% | 72.19% | 92.43% |

The weights of the connections 130 may be pruned in a similar manner, e.g., a standard deviation of the weights of the connections 130 between two layers (e.g., between the input layer 110 and the first hidden layer 120) may be calculated, and any weight that is less than the product of the (empirically determined) threshold and the standard deviation may be set to zero.

Once the neural network has been trained, pruned, and retrained, the neural network, or one or more copies of the neural network, with "final" weights resulting from the process of training, pruning, and retraining, may be used as classifying neural networks (as opposed to the neural network used to perform training or retraining). Such a classifying neural network may be constructed (e.g., by fabricating suitable application-specific hardware or by compiling suitable software or firmware) to run efficiently on a small, low-power platform.

In some embodiments, neural networks trained, pruned, and retrained as described herein (or copies of such neural networks) may be used to perform various classification tasks, such as voice or speech recognition, or image recognition. The classification operations may be part of systems and methods for autonomous driving of vehicles, or control of other robots, or for translation (e.g., a system with a microphone, and a speaker, that, upon receiving a spoken word, recognizes the word using a neural network according to an embodiment of the present disclosure, translates the word into another language, and outputs the translated word as an audio signal from the speaker).

In some embodiments the classifying neural network is implemented in software or firmware executing in a processing circuit. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB. In some embodiments a first processing circuit (e.g., a processing circuit possessing considerable processing power, and which may consume significant amounts of power and occupy a relatively large volume) may be used to perform the training, pruning, and retraining, and a second processing circuit (e.g., a small, low-power processing circuit in a mobile device or in an automobile) may be used to perform classification, using the weights and biases generated by the first processing circuit.

For example, each of the long short-term memory cells 310 may be created, in memory (e.g., as an object), by a graphics processing unit, with associated weights. Memory locations that otherwise would be used to store data corresponding to pruned weights may be used for other purposes, and operations that otherwise would be performed may be omitted for pruned weights.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for selective pruning in a long short-term memory network have been specifically described and illustrated herein, many modifications and variations will be apparent to those skilled in the art. Accordingly, it is to be understood that a system and method for selective pruning in a long short-term memory network constructed according to principles of this disclosure may be embodied other than as specifically described herein. The invention is also defined in the following claims, and equivalents thereof.

What is claimed is:

1. A method for performing machine learning in a first neural network comprising one or more long short-term memory cells, a first long short-term memory cell of the one or more long short-term memory cells comprising:
    an input having a first weight matrix $W_c$;
    an input gate having a first weight matrix $W_i$;
    a forget gate having a first weight matrix $W_f$; and
    an output gate having a first weight matrix $W_o$,
    the method comprising:
        maintaining the first weight matrix $W_c$ unchanged; and
        pruning the first weight matrix $W_f$, the pruning of the first weight matrix $W_f$ comprising:
            calculating a standard deviation over a subset of elements of the first weight matrix $W_f$;
            determining that a first element, at a first position in the first weight matrix $W_f$, fails to meet a first threshold, the first threshold being based on a second threshold and the standard deviation;
            setting to zero the first element, at the first position in the first weight matrix $W_f$, based on determining that the first element, at the first position in the first weight matrix $W_f$, fails to meet the first threshold;
            determining that a second element, at a second position in the first weight matrix $W_f$, meets the first threshold; and
            maintaining the second element unchanged, based on determining that the second element, at the second position in the first weight matrix $W_f$, meets the first threshold.

2. The method of claim 1, wherein a second long short-term memory cell of the one or more long short-term memory cells comprises an input gate having a second weight matrix $W_f$ and wherein the calculating of the standard deviation comprises calculating a standard deviation over all elements of the first and second weight matrices $W_f$.

3. The method of claim 1, wherein the subset of elements of the first weight matrix $W_f$ includes all elements of the first weight matrix $W_f$.

4. The method of claim 1, wherein a second long short-term memory cell of the one or more long short-term memory cells comprises a second weight matrix $W_f$ and wherein the calculating of the standard deviation comprises calculating a standard deviation over all elements at the first position in the first and second weight matrices $W_f$.

5. The method of claim 1, further comprising pruning the first weight matrix $W_i$.

6. The method of claim 1, further comprising pruning the first weight matrix $W_o$.

7. The method of claim 1, wherein the first neural network further comprises a plurality of artificial neurons and a plurality of connections between the artificial neurons, each of the connections having a weight, and the method further comprises:
    calculating a standard deviation over the weights of the connections;
    setting to zero the weight of a connection of the plurality of connections when a magnitude of the weight is smaller than a product of a threshold and the standard deviation; and
    leaving the weight of the connection unchanged, otherwise.

8. The method of claim 1, further comprising retraining the first neural network, the retraining comprising maintaining the first element equal to zero.

9. The method of claim 8, further comprising operating a second neural network, the second neural network having a weight matrix $W_f$ equal to the weight matrix $W_f$ of the first neural network, the operating comprising:
    classifying an image with the second neural network, and
    controlling a vehicle based on the classifying of the image.

10. A system for performing machine learning, the system comprising a first processing circuit, the first processing circuit being configured to:
    instantiate a first neural network comprising one or more long short-term memory cells, a first long short-term memory cell of the one or more long short-term memory cells comprising:
        an input having a first weight matrix $W_c$;
        an input gate having a first weight matrix $W_i$;
        a forget gate having a first weight matrix $W_f$; and
        an output gate having a first weight matrix $W_o$,
    maintain the first weight matrix $W_c$ unchanged; and prune the first weight matrix $W_f$, the pruning of the first weight matrix $W_f$ comprising:

calculating a standard deviation over a subset of elements of the plurality of weight matrices $W_f$;

determining that a first element, at a first position in the first weight matrix $W_f$, fails to meet a first threshold, the first threshold being based on a second threshold and the standard deviation;

setting to zero the first element, at the first position in the first weight matrix $W_f$, based on determining that the first element, at the first position in the first weight matrix $W_f$, fails to meet the first threshold;

determining that a second element, at a second position in the first weight matrix $W_f$, meets the first threshold; and maintaining the second element unchanged, based on determining that the second element, at the second position in the first weight matrix $W_f$, meets the first threshold.

11. The system of claim 10, wherein a second long short-term memory cell of the one or more long short-term memory cells comprises an input gate having a second weight matrix $W_f$ and wherein the calculating of the standard deviation comprises calculating a standard deviation over all elements of the first and second weight matrices $W_f$.

12. The system of claim 10, wherein the subset of elements of the first weight matrix $W_f$ includes all elements of the first weight matrix $W_f$.

13. The system of claim 10, wherein a second long short-term memory cell of the one or more long short-term memory cells comprises a second weight matrix $W_f$ and wherein the calculating of the standard deviation comprises calculating a standard deviation over all elements at the first position in the first and second weight matrices $W_f$.

14. The system of claim 10, wherein the first processing circuit is further configured to prune the first weight matrix $W_i$.

15. The system of claim 10, wherein the first processing circuit is further configured to prune the first weight matrix $W_o$.

16. The system of claim 10, wherein the system further comprises a plurality of artificial neurons and a plurality of connections between the artificial neurons, each of the connections having a weight, and the first processing circuit is further configured to:

calculate a standard deviation over the weights of the connections;

set to zero the weight of a connection of the plurality of connections when a magnitude of the weight is smaller than a product of a threshold and the standard deviation; and leave the weight of the connection unchanged, otherwise.

17. The system of claim 10, wherein the first processing circuit is further configured to retrain the first neural network, the retraining comprising leaving the first element equal to zero.

18. The system of claim 17, further comprising a second processing circuit configured to instantiate a second neural network, the second neural network having a weight matrix $W_f$ equal to the weight matrix $W_f$ of the first neural network, and to:

classify images with the second neural network, and control a vehicle based on the classifying of the images.

19. A method for performing machine learning in a first neural network comprising one or more long short-term memory cells, a first long short-term memory cell of the one or more long short-term memory cells comprising:

an input having a first weight matrix $W_c$;

an input gate having a first weight matrix $W_i$;

a forget gate having a first weight matrix $W_f$; and an output gate having a first weight matrix $W_o$, the method comprising:

maintaining the first weight matrix $W_c$ unchanged; and performing a step for pruning the first weight matrix $W_f$.

20. The method of claim 19, wherein the step for pruning comprises:

calculating a standard deviation over a subset of elements of the first weight matrix $W_f$;

determining that a first element, at a first position in the first weight matrix $W_f$, fails to meet a first threshold, the first threshold being based on a second threshold and the standard deviation;

setting to zero the first element, at the first position in the first weight matrix $W_f$, based on determining that the first element, at the first position in the first weight matrix $W_f$, fails to meet the first threshold;

determining that a second element, at a second position in the first weight matrix $W_f$, meets the first threshold; and maintaining the second element unchanged, based on determining that the second element, at the second position in the first weight matrix $W_f$, meets the first threshold.

* * * * *